Figure 1:
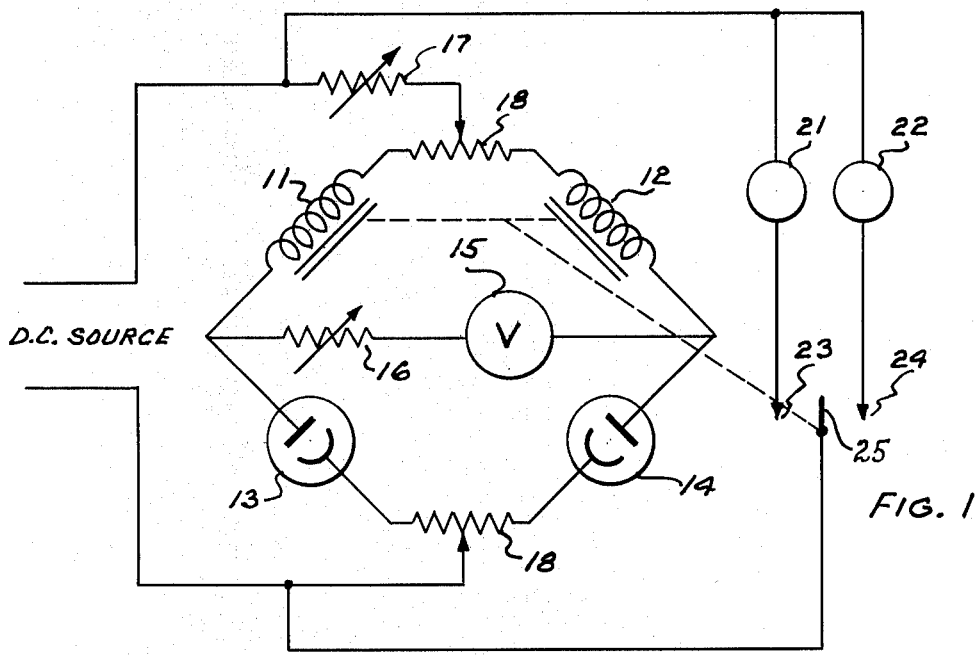

Jan. 25, 1966  E. R. DOUBEK, JR., ETAL  3,231,745
BRIDGE CIRCUIT WITH TWO DISTINCT INDICATING OUTPUTS
Filed July 6, 1961

INVENTORS
E. R. DOUBEK, JR.
G. H. KLENKE
BY
ATTORNEY

# United States Patent Office 3,231,745
Patented Jan. 25, 1966

3,231,745
BRIDGE CIRCUIT WITH TWO DISTINCT
INDICATING OUTPUTS
Edward R. Doubek, Jr., Brookfield, and Gerald H.
Klenke, Batavia, Ill., assignors to Western Electric
Company, Incorporated, New York, N.Y., a corporation of New York
Filed July 6, 1961, Ser. No. 122,235
7 Claims. (Cl. 250—210)

This invention relates to a bridge circuit having two distinct outputs, and more particularly to a bridge circuit having a quantitative, infinitely variable output and a qualitative output consisting of stepped or digital signals. It is an object of the invention to provide an improved bridge circuit of such character.

In testing procedures it is frequently desirable that the test apparatus give quantitative results such that the operator may observe the precise value of the characteristic being measured. At the same time, it may be intended that the operaor not be required to observe each test result but that he note the indicated value of the measured characteristic only when the value falls within or without a given range. In this case a second output of the bridge is desirable in order that the operator's attention may be directed to the fact that the measured value is such that it should be noted.

It is also desirable on occasion that the scale of the indicating device of a bridge circuit be altered to permit accurate detection of relatively small values of the measured characteristic as well as relatively large values thereof. This, too, can be accomplished by providing a qualitative as well as a quantitative output of a bridge circuit, the qualitative output being employed to change the scale of the quantitative output automatically depending upon the range within which the measured value falls.

It is also desired on occasion that testing apparatus be arranged to produce two signals one of which is substantially instantaneous upon detection of a critical value of a measured characteristic while the other is time delayed and is effective to produce a signal only if the critical value of the measured characteristic persists. Here again two outputs of a bridge may be employed to obtain the desired effect, one output giving an instantaneous signal and the other producing a time delayed signal.

In accordance with the present invention a bridge circuit is provided wherein the input of a translating device is included in or comprises at least one leg of a bridge. In such a bridge, the translating device not only forms part of the bridge impedance, thereby affecting the conventional output of the bridge as measured across two opposed corners thereof, but also serves to produce a qualitative output which consists of two or more distinct signals. In accordance with the preferred embodiment of the invention, the translating device comprises an electromagnetically operated relay whose input coil forms one leg of the bridge or a portion thereof, and a D.C. voltage is applied to the bridge. In accordance with this preferred embodiment of the invention, operation of the relay to actuate an external indicating device and thereby provide a qualitative output of the bridge circuit has no significant effect on the quantitative output since the inductance of the input coil of the relay remains substantially constant during actuation of the relay. Further in accordance with the preferred embodiment of the invention, a polar relay is employed with its two input coils included in or comprising two different legs of the bridge, the qualitative output comprising three distinct signals which may be termed satisfactory, too high, and too low.

Accordingly, it is another object of the invention to provide an improved bridge circuit wherein the input of a translating device forms at least a part of at least one leg of the bridge whereby the input of the device forms an impedance which affects the normal output of the bridge, while the output of the translating device constitutes a second output of the bridge.

It is still another object of the invention to provide an improved bridge circuit wherein the input of a translating device forms at least a part of at least one leg of the bridge such that the output of the translating device comprises a second output of the bridge, and wherein actuation of the translating device has no significant effect on the normal or conventional output of the bridge.

It is a further object of the invention to provide an improved bridge circuit wherein the two inputs of a polar relay form at least part of two legs of the bridge and wherein the normal or conventional bridge output gives a quantitative indication of test results and the three possible outputs of the polar relay indicate three ranges of values of the test results.

Figure 2:
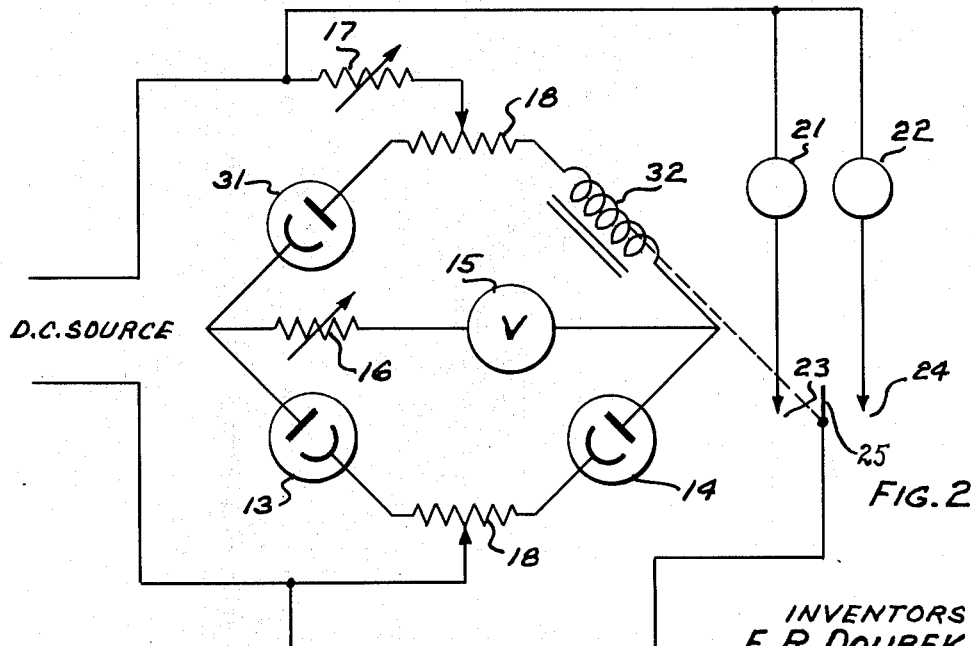

This invention, together with further objects and advantages thereof, will best be understood by reference to the following description taken in connection with the accompanying drawing, in which FIG. 1 is a circuit diagram of a bridge circuit embodying the present invention, and FIG. 2 is a circuit diagram illustrating another embodiment of the invention.

The circuit of FIG. 1 is particularly adapted to the testing of a succession of articles, the circuit giving a quantitative indication of test results and also indicating into which of three classes the test results fall. These three classes may logically be defined as satisfactory, too high, and too low. It will be appreciated, however, that the invention is not limited to the application illustrated in FIG. 1 but is of broad applicability.

The bridge of FIG. 1 has four legs consisting primarily of input windings 11 and 12 of a polar relay of a type similar to that disclosed in C. V. Bullen et al. Patent No. 2,443,784, and two photocells 13 and 14. D.C. voltage is applied to two opposed corners of the bridge by the indicated D.C. source, while an indicator such as a voltmeter 15 is connected across the other two opposed corners of the bridge.

A variable resistor 16 is arranged in series with the voltmeter 15 in order to permit adjustment of the sensitivity of the voltmeter. Another variable resistor 17 is arranged in series with the entire bridge in order to regulate its response. Two potentiometers 18 are arrange as shown at the corners of the bridge to which the voltage is applied to permit balance of the left and righthand sides of the bridge. More specifically, if the two windings 11 and 12 of the polar relay are slightly unbalanced, or if the photocells 13 and 14 are slightly unbalanced, compensation may be made by adjustment of one or both of the potentiometers 18.

Also connected across the D.C. source are two indicating lamps 21 and 22, each of which is controlled by corresponding contacts 23 and 24 of the polar relay whose windings 11 and 12 constitute portions of the bridge circuit.

An armature 25 of the polar relay is mounted for pivotable movement between the relay contacts 23 and 24. The armature 25 is both pivoted between and into engagement with its associated contacts 23 and 24 in response to a differential existing in the amount of current flowing through the coils 11 and 12, which coils are ganged with the armature.

In the embodiment of the invention disclosed in FIG. 1, the armature 25 is held in its neutral position by a prescribed amperage flowing in opposed directions through the ganged coils 11 and 12. When the amperage passing through one of the two coils is increased or decreased from the amperage passing through the other coil, even though the polarity of each coil remains the same, the armature is pivoted toward one of the two associated relay contacts 23 and 24. When the differential in current passing through the two coils is of sufficient magnitude, the armature is pivoted sufficiently to engage either contact 23 or 24 whereby a power circuit from the D.C. source is closed to either indicating light 21 or 22.

The photocells 13 and 14 are merely representative of any desired form of variable which may be introduced in one or both of the two lower legs. In the case of the two photocells, the resistance values of the two lower legs of the bridge may be altered by variation in intensity of light beams directed against the photocells.

With the bridge properly balanced, and with sensitivity at a desired level, any inequality of resistance in the two lower legs of the bridge, within prescribed limits, will leave the polar relay in its normal position with both of the contacts 23 and 24 open. In this case neither of the indicating lamps will be illuminated. This condition may be employed to indicate that the article being tested is satisfactory. Under these circumstances, the operator presumably need not observe the voltmeter 15, but if he does, he may note the degree of unbalance.

In the event that the resistance of one of the lower legs is substantially greater than that of the other in a given test, a sufficient differential will exist in the current flowing through the coils 11 and 12 to pivot the armature 25 of the polar relay and make contact with the contact 23, for example, such that the indicating lamp 21 is illuminated. This closure of a particular one of the contacts may serve as a warning to the operator that the article being tested is unsatisfactory in that it falls to one side of prescribed limits. The operator may then observe the voltmeter 15 to determine the magnitude of the error.

In the event that the bridge should be unbalanced in the other direction by virtue of substantially unbalanced resistance values in the lower legs of the bridge, the polar relay would be thrown in the opposite direction and close the contact 24 to illuminate the indicating lamp 22. This would serve to warn the operator that the test is unsatisfactory in that the article falls to the other side of the prescribed limits. Again the operator may refer to the voltmeter 15 to determine the extent of the error.

The bridge circuit of FIG. 2 is identical in most respects to that of FIG. 1, and similar parts have been designated by the same reference numerals. More particularly, the only elements which differ from the showing of FIG. 1 are a third photocell 31, forming the upper lefthand leg of the bridge, and the coil 32 which may be either coil of the same polar relay employed in FIG. 1, or it may be the two coils of the relay arranged either in series or in parallel.

In the embodiment disclosed in FIG. 2, the armature 25 is initially adjusted, when no current is flowing through the coil 32, so as to engage one of the contacts 23 or 24. When a prescribed voltage is applied across the bridge and the photocells 13, 14 and 31 present predetermined resistances within the bridge, a prescribed current will flow through the coil 32 whereby its ganged armature 25 is pivoted out of engagement with an associated one of the contacts 23 or 24 to the neutral position.

Thereafter, in response to any selective changes in the resistances of photocells 13, 14 and/or 31, the current flowing through the coil 32 will be increased or decreased from that prescribed current which keeps the associated armature in its neutral position. Whenever a sufficient positive or negative differential exists between the current flowing through the coil 32 and the prescribed current, the armature will be fully pivoted to engage either one of its associated contacts 23 or 24 whereby either indicating lamp 21 or 22 will be illuminated. The use of a third photocell 31 permits the introduction of a third variable in the testing procedure, where this desired. As in the case of the bridge circuit of FIG. 1, the indicating lamps 21 and 22 will be illuminated when the article being tested falls outside of prescribed limits, and the voltmeter 15 may be observed during any test but especially when either of the indicating lamps directs the operator's attention to the fact that the article under test falls outside of prescribed limits.

It has been found that under certain operating conditions wherein light beams are varied in accordance with the tests being conducted, the various elements of the illustrated bridge circuits may be of the following values or types:

Variable resistors 17, 500 ohms, 2 watt.
Potentiometers 18, 20,000 ohms, 5 watt.
Variable resistor 16, 2 megohms, 2 watt.
Photocells, Clairex, CL 2.
Polar relay, Barber-Coleman, 3192-S.

It will be appreciated that bridge circuits have been disclosed which employ the input of a translating device as at least part of at least one leg of a bridge, the translating device thereby affecting the normal quantitative output of the bridge, and, at the same time, serving to provide a second qualitative bridge output which consists of stepped or digital signals. In the particular examples illustrated, the secondary output consists of three distinct signals, one indicating satisfactory test and the other two indicating test results which are too high or too low. Such secondary signals may serve to attract the operator's attention to the unsatisfactory character of the test, whereupon he may observe the normal or quantitative output of the bridge for a more sensitive indication of the degree of error.

It will be apparent to those skilled in the art that the two or more signals constituting the secondary output of the bridge might be employed to vary the setting of the variable resistor 16 such that the scale of the meter 15 is varied in accordance with the degree of unbalance of the bridge. Still further applications of the invention will be apparent to those skilled in the art.

While various embodiments of the invention have been disclosed, many modifications will be apparent, and it is intended that the invention be interpreted as including all modifications which fall within the true spirit and scope of the invention.

What is claimed is:

1. In a bridge circuit wherein two opposed bridge corners to which voltage is to be applied are connected by two parallel circuit paths, each defined by a pair of series connected legs defining a common output bridge corner therebetween:

a first indicating device connected to and responsive to a voltage difference between the two common output bridge corners of the two pairs of legs;

a variable resistance measuring device electrically connected in a first leg of a first one of the two pairs of legs, said measuring device presenting within the circuit a value of resistance which varies as a function of the magnitude of an external condition being measured by said measuring device;

an electro-magnetically operated relay having at least a portion of its input coil in the second leg of the first pair of legs such that said relay operates when the magnitude of the external condition being measured by said measuring device passes through a prescribed value; and a second indicating device operatively responsive to the operation of said relay to indicate whether the magnitude of the external condition is above or below a prescribed value.

2. In a bridge circuit wherein two opposed bridge corners to which voltage is to be applied are connected by two parallel circuit paths, each defined by a pair of series connected legs defining a common output bridge corner therebetween:

a quantitative indicating device connected to and responsive to a voltage difference between the two common output bridge corners of the two pairs of legs;

a variable resistance measuring device electrically connected in a first leg of a first one of the two pairs of legs, said measuring device presenting within the circuit a value of resistance which varies as a function of the magnitude of an external condition being measured by said measuring device;

an electro-magnetically operated relay having its input coil in the second leg of the first pair of legs such that said relay operates when the magnitude of the external condition being measured by said measuring device passes through a prescribed value; and a qualitative indicating device operatively responsive to operation of said relay to indicate whether the magnitude of the external condition is above or below a prescribed value.

3. In a bridge circuit wherein two opposed bridge corners to which voltage is to be applied are connected by two parallel circuit paths, each defined by a pair of series connected legs defining a common output bridge corner therebetween:

a quantitative indicating device connected to and responsive to a voltage difference between the two common output bridge corners of the two pairs of legs;

a pair of measuring devices, one of said variable resistance measuring devices being electrically connected in a first leg of each pair of legs, said measuring devices presenting within the circuit a value of resistance which varies as a function of the magnitude of an external condition being measured by said measuring devices;

an electro-magnetically operated relay having a portion of its input coil included in the second leg of each pair of legs such that said relay operates when the magnitude of the external condition being measured by said measuring devices passes through a prescribed value; and a qualitative indicating device operatively responsive to the operation of said relay to indicate whether the magnitude of the external condition is above or below a prescribed value.

4. In a bridge circuit wherein two opposed bridge corners to which voltage is to be applied are connected by two parallel circuit paths, each defined by a pair of series connected legs defining a common output bridge corner therebetween:

a quantitative indicating device connected to and responsive to a D.C. voltage difference between the two common output bridge corners of the two pairs of legs;

a variable resistance measuring device electrically connected in a first leg of a first one of the two pairs of legs, said measuring device presenting within the circuit a value of resistance which varies as a function of the magnitude of an external condition being measured by said measuring device;

an electro-magnetically operated relay having its input coil of constant resistance in the second leg of the first pair of legs such that said relay operates without affecting the resistance balance of the bridge when the magnitude of the external condition being measured by said measuring device passes through a prescribed value; and a qualitative indicating device operatively responsive to the operation of said relay to indicate whether the magnitude of the external condition is above or below a prescribed value.

5. In a bridge circuit wherein two opposed bridge corners to which voltage is to be applied are connected by two parallel circuit paths, each defined by a pair of series connected legs defining a common bridge corner therebetween:

a quantitative indicating device connected to and responsive to a D.C. voltage difference between the two common output bridge corners of the two pairs of legs;

a pair of variable resistance measuring devices, one of said measuring devices being electrically connected in a first leg of each pair of legs, said measuring devices presenting within the circuit a valuve of resistance which varies as a function of the magnitude of an external condition being measured by said measuring devices;

an electro-magnetically operated relay having a portion of its input coil of constant resistance included in the second leg of each pair of legs such that said relay operates without affecting the resistance balance of the bridge when the magnitude of the external condition being measured by said measuring devices passes through a prescribed value; and a qualitative indicating device operatively responsive to the operation of said relay to indicate whether the magnitude of the external condition is above or below a prescribed value.

6. In a bridge circuit wherein two opposed bridge corners to which voltage is to be applied are connected by two parallel circuit paths, each defined by a pair of series connected legs defining a common output bridge corner therebetween:

a D.C. voltmeter connected to and responsive to a D.C. voltage difference between the two common output bridge corners of the two pairs of legs;

three photocells included in three separate legs of the bridge circuit, said photocells presenting a variabe resistance within the circuit in response to changes in the magnitude of an external condition being measured by said photocells;

a polar relay having its input coil of constant resistance included in the fourth leg of the bridge circuit such that said relay operates without affecting the resistance balance of the bridge when the magnitude of the external condition being measured by said photocells passes through a prescribed value; and a qualitative indicating device operatively responsive to the operation of said relay to indicate whether the magnitude of the external condition is above or below a prescribed value.

7. In a bridge circuit wherein two opposed bridge corners to which voltage is to be applied are connected by two parallel circuit paths, each defined by a pair of series connected legs defining a common output bridge corner therebetween:

a D.C. voltmeter connected to and responsive to a D.C. voltage difference between the two common output bridge corners of the two pairs of legs;

a pair of photocells, one of said photocells being included in one leg of each pair of legs, said photocells presenting a variable resistance within the circuit in response to changes in the magnitued of an external condition being measured by said photocells;

a polar relay having a portion of its input coil of constant resistance included in the second leg of each pair of legs such that said relay operates without affecting the resistance balance of the bridge when the magnitude of the external condition being measured by said photocells passes through a prescribed value; and a qualitative indicating device operatively responsive to the operation of said relay to indicate whether the magnitude of the external condition is above or below a prescribed value.

References Cited by the Examiner
UNITED STATES PATENTS

| | | | |
|---|---|---|---|
| Re. 20,823 | 8/1938 | Goodwin | 250—210 X |
| 2,346,589 | 4/1944 | Lamb | 317—153 |
| 2,864,036 | 12/1958 | Steiner | 317—153 |
| 2,962,703 | 11/1960 | Summerer | 340—233 |

RALPH G. NILSON, *Primary Examiner.*